United States Patent
Furusawa

(10) Patent No.: US 9,948,569 B2
(45) Date of Patent: Apr. 17, 2018

(54) STATION-SIDE TERMINAL APPARATUS, AND PATH SWITCHING METHOD

(71) Applicant: Oki Electric Industry Co., Ltd., Tokyo (JP)

(72) Inventor: Satoshi Furusawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 337 days.

(21) Appl. No.: 14/831,869

(22) Filed: Aug. 20, 2015

(65) Prior Publication Data

US 2016/0094469 A1 Mar. 31, 2016

(30) Foreign Application Priority Data

Sep. 26, 2014 (JP) ................................. 2014-197272

(51) Int. Cl.
*H04J 14/00* (2006.01)
*H04L 12/863* (2013.01)
(Continued)

(52) U.S. Cl.
CPC .......... *H04L 47/54* (2013.01); *H04L 47/6215* (2013.01); *H04L 47/6275* (2013.01); *H04Q 11/0003* (2013.01); *H04Q 11/0067* (2013.01); *H04Q 2011/0047* (2013.01); *H04Q 2011/0064* (2013.01); *H04Q 2011/0077* (2013.01)

(58) Field of Classification Search
CPC .......... H04Q 11/0066; H04Q 11/0067; H04Q 11/0005; H04Q 11/0003; H04Q 11/0062; H04J 14/0246; H04J 14/0227; H04J 14/0223; H04L 47/54; H04L 47/62
USPC ........ 398/66, 67, 68, 69, 70, 71, 72, 98, 99, 398/100, 58, 45, 48, 49, 79, 46, 47, 50, 398/53; 370/352, 392, 389, 468, 235, 370/465
See application file for complete search history.

(56) References Cited

U.S. PATENT DOCUMENTS 9,503,212 B2 * 11/2016 Sugawa .............. H04J 14/0257
2010/0067913 A1 * 3/2010 Niibe ..................... H04B 10/70
398/98

FOREIGN PATENT DOCUMENTS

JP H10-229404 A 8/1998
JP 2011-055407 A 3/2011

OTHER PUBLICATIONS

P149 "77. Multipoint MAC Control for 10G-EPON" and p. 171, "77 .3 Multipoint Control Protocol (MPCP)", IEEE Std 802.3av-2009.

* cited by examiner

Primary Examiner — Hanh Phan
(74) Attorney, Agent, or Firm — Rabin & Berdo, P.C.

(57) ABSTRACT

A station-side terminal apparatus comprises terminal devices and a terminal device sorting unit. The terminal devices includes: a buffer unit; a subscriber-side terminal apparatus sorting unit configured to transmit a unicast packet addressed to a switch-target subscriber-side terminal apparatus to the switch queues, and transmit a packet addressed to a plurality of subscriber-side terminal apparatuses to the broadcast queue, and transmit a unicast packet addressed to a non-switch-target subscriber-side terminal apparatus to the through queue; and a scheduler unit configured to read a packet from the switch queues, the broadcast queue, and the through queue. The terminal device sorting unit is configured to transmit a received unicast packet to the terminal device, and transmit a received packet addressed to a plurality of subscriber-side terminal apparatuses, to each of the terminal devices.

16 Claims, 5 Drawing Sheets

(51) Int. Cl.
*H04Q 11/00* (2006.01)
*H04L 12/865* (2013.01)

STATION-SIDE TERMINAL APPARATUS, AND PATH SWITCHING METHOD

CROSS REFERENCE TO RELATED APPLICATION(S)

This application is based upon and claims benefit of priority from Japanese Patent Application No. 2014-197272, filed on Sep. 26, 2014, the entire contents of which are incorporated herein by reference.

BACKGROUND

The present invention relates to a station-side terminal apparatus capable of dynamically switching a connection with a subscriber-side terminal apparatus, and a path switching method that switches a connection between a subscriber-side terminal apparatus and a station-side terminal apparatus.

In recent years, a service called FTTH (Fiber To The Home) using the optical fiber as a transmission channel is becoming widespread, for the purpose of providing a broad band service of high speed and wide band to general private homes. For providing the broad band service by FTTH, optical access networks called subscriber passive optical network (PON) are utilized in many places.

In the PON, one station-side terminal apparatus (OLT: Optical Line Terminal) and a plurality of subscriber-side terminal apparatuses (ONU: Optical Network Unit) are connected by branching one optical cable using optical passive elements called optical splitter (optical coupler). In the PON, the FTTH service is provided economically by sharing optical fibers, OLT, etc by a plurality of subscribers.

The PON includes what is called 10G-EPON (10 Gigabit Ethernet (registered trademark) PON) (for example, refer to IEEE (Institute of Electrical and Electronics Engineers) std 802. 3av-2009). In the PON described in this reference, communication from each ONU to the OLT (uplink communication) employs TDMA (Time Division Multiple Access) technology to prevent a collision of signals from each ONU. PON using the TDMA technology is also called TDM-PON.

Further, in order to meet an increase of communication demand in future optical access network, the research and development relevant to WDM/TDM-PON (TWDM-PON) is progressing, in which a plurality of TDM-PONs are built on one PON infrastructure with WDM (Wavelength Division Multiplexing) technology, as next-generation PON with a transmission rate over 10 Gbps, (for example, refer to JP 2011-55407A). TWDM-PON increases the transmission capacity in the PON infrastructure.

In the TWDM-PON described in JP 2011-55407A, an OLT includes a plurality of optical transmitting and receiving units, and a control device for controlling the TWDM-PON. Each optical transmitting and receiving unit is connected to a plurality of ONUs via optical couplers.

As for uplink communication, the reception wavelength of each optical transmitting and receiving unit of the OLT is fixedly assigned, so that the reception wavelengths of optical transmitting and receiving units of the OLTs do not overlap each other. In this case, by changing the transmission wavelength of the optical transmitting and receiving unit of the ONU, the connection between each optical transmitting and receiving unit of the OLT and the ONU is dynamically switched. Also, as for communication from the OLT to the ONU (downlink communication), the connection between each optical transmitting and receiving unit of the OLT and the ONU is dynamically switched by fixedly assigning the transmission wavelength of each optical transmitting and receiving unit of the OLT, and changing the reception wavelength of the optical transmitting and receiving unit of the ONU, in the same way as the uplink communication. Hence, the TWDM-PON has the advantage such as load sharing in response to traffic variation, high reliability by path switching in failure, and electrical power saving by sleep of the optical transmitting and receiving unit and the device circuit during low load.

Here, in the TWDM-PON, when dynamically switching the connection of the OLT and the ONU relevant to the downlink communication for example, a switch of the optical transmitting and receiving unit of the OLT, and a switch of the reception wavelength of the ONU are performed. During a switching time period when the reception wavelength of the ONU is switched from a pre-switch wavelength to a post-switch wavelength, the ONU does not receive the packet of the downlink communication (hereinafter, also referred to as "downlink packet" simply). However, in a multimedia application and the like, it is desirable that a packet loss does not occur during the switching time period in view of service quality, and a switching process without consuming a time is requested.

Hence, in order to prevent a packet loss of downlink communication in the switching time period, it is necessary that the OLT buffers packets addressed to the switch target ONU during the switching time period.

As means for buffering the input packets and switching the communication path, there is proposed a technology that a buffer is provided at a stage prior to a switch for switching the path, and the switch switches the path in response to the destination of the input packet (for example, refer to JP H 10-229404A).

SUMMARY

Here, in the TVs/DM-PON, the OLT identifies the downlink packet of each the ONU, and sorts the packet into the optical transmitting and receiving unit to which the transmission wavelength corresponding to the reception wavelength of the ONU at the time point is assigned.

When the configuration disclosed in JP H 10-229404A described above is employed to switch the path without consuming time in the TWDM-PON, it is necessary that the buffers provided at a stage prior to the switch are of the number of the ONUs contained in the TWDM-PON. Hence, when the number of the contained ONUs is many, the circuit size enlarges. Also, each buffer needs to have a capacity that can store the packets of the switching time period, and therefore, when the time period for switching is long, a large buffer amount is necessary. The increase of the circuit size and the buffer amount can be problematic for feasibility of the device.

On the other hand, when a shared buffer method that shares a buffer is employed, the address administrative information increases, as the number of the contained ONUs increases. Hence, when the number of the contained ONUs is many, a large memory is necessary for address management, which is problematic for feasibility of the device.

Thus, even when the number of the contained ONU is many, it is desirable to provide an OLT capable of dynamically switching a connection with an ONU without generating a packet loss, and a path switching method that switches a connection between the ONU and the OLT, without increasing the circuit size.

The OLT according to one embodiment of the present invention comprises: a plurality of terminal devices (OSU: Optical Subscriber Unit) and an OSU sorting unit. Each of the OSUs comprises: a buffer unit including a through queue, a broadcast queue, and one or more switch queues; a ONU sorting unit configured to transmit a unicast packet addressed to a switch-target ONU to the switch queues, and transmit a packet addressed to a plurality of ONUs to the broadcast queue, and transmit a unicast packet addressed to a non-switch-target ONU to the through queue; and a scheduler unit configured to read a packet from the switch queues, the broadcast queue, and the through queue. The OSU sorting unit transmits a received unicast packet to the OSU in which an ONU of a destination of the unicast packet is registered. Also, the OSU sorting unit transmits a packet addressed to a plurality of ONUs, to each of the OSUs in which the ONU of destinations of the packet are registered.

The first path switching method according to one embodiment of the present invention is implemented in the networks including the OLT described above, for example. This method comprises the following processes.

An OSU sorting unit changes a transmission destination of a unicast packet addressed to a switch-target ONU, from a switching-source OSU to a switching-destination OSU.

An ONU sorting unit of a switching-destination OSU transmits a unicast packet addressed to an ONU to a learned switch queue, when the switch-target ONU has been learned, with reference to a learning table; and transmits a unicast packet addressed to the ONU to an unused switch queue, and registers the switch queue in the learning table, when the switch-target ONU has not been learned. The ONU sorting unit of each of the OSUs transmits a packet addressed to a plurality of the ONUs to the broadcast queue.

A switching-source OSU starts a transmission addressed to a switch-target ONU, and Each of OSUs starts a transmission of a packet addressed to a plurality of ONUs, after an amount of packets addressed to a switch-target ONU accumulated in the switching-source OSU becomes zero.

The switch-target ONU is released from the learning table, and the ONU sorting unit transmits the unicast packet addressed to the switch-target ONU via the through queue, after the amount of unicast packets addressed to the switch-target ONU accumulated in the switching-source OSU becomes zero.

The second path switching method according to one embodiment of the present invention is implemented in the networks including the OLT described above, for example. This method comprises the following processes.

An OSU sorting unit changes a transmission destination of a unicast packet addressed to a switch-target ONU, from a switching-source OSU to a switching-destination OSU.

An ONU sorting unit of the switching-destination OSU transmits a unicast packet addressed to the ONU to a learned switch queue, when the switch-target ONU has been learned, with reference to a learning table; and transmits a unicast packet addressed to the ONU to an unused switch queue, and registers the switch queue in the learning table, when the switch-target ONU has not been learned. The ONU sorting unit of each of the OSUs transmits a packet addressed to a plurality of the ONUs to the broadcast queue. Also, the ONU sorting unit of each of OSUs transmits a packet addressed to a plurality of ONUs whose destinations include the ONU, to the broadcast queue and a learned switch queues, when a switch-target ONU has been learned, with reference to a learning table; and transmits a packet addressed to a plurality of ONUs whose destinations include the ONU, to the broadcast queue and an unused switch queue, and registers the switch queue in the learning table, when the switch-target ONU has not been learned.

A switching-source OSU starts a transmission addressed to the switch-target ONU, and each of OSUs starts a transmission of a packet addressed to a plurality of ONUs whose destinations include the switch-target ONU, after an amount of packets addressed to the switch-target ONU accumulated in the switching-source OSU becomes zero.

The switch-target ONU is released from the learning table, and the ONU sorting unit transmits the unicast packet addressed to the switch-target ONU via the through queue and the packet addressed to a plurality of ONUs whose destinations include the ONU via the through broadcast queue, after the amount of unicast packets addressed to the switch-target ONU accumulated in the switching-source OSU and the amount of packets addressed to a plurality of ONUs whose destinations include the ONU become zero.

According to the OLT and the path switching method of the present invention, the number of the ONUs that perform a switching process simultaneously is limited to make the switch queues for storing the packets during switch processing to be fewer than the number of the contained ONUs.

Also, since the queue number is reduced, the memory amount for address management of the buffer is reduced. Thereby, an OLT capable of switching without consuming time is provided economically.

DETAILED DESCRIPTION OF THE EMBODIMENT(S)

Figure 1:
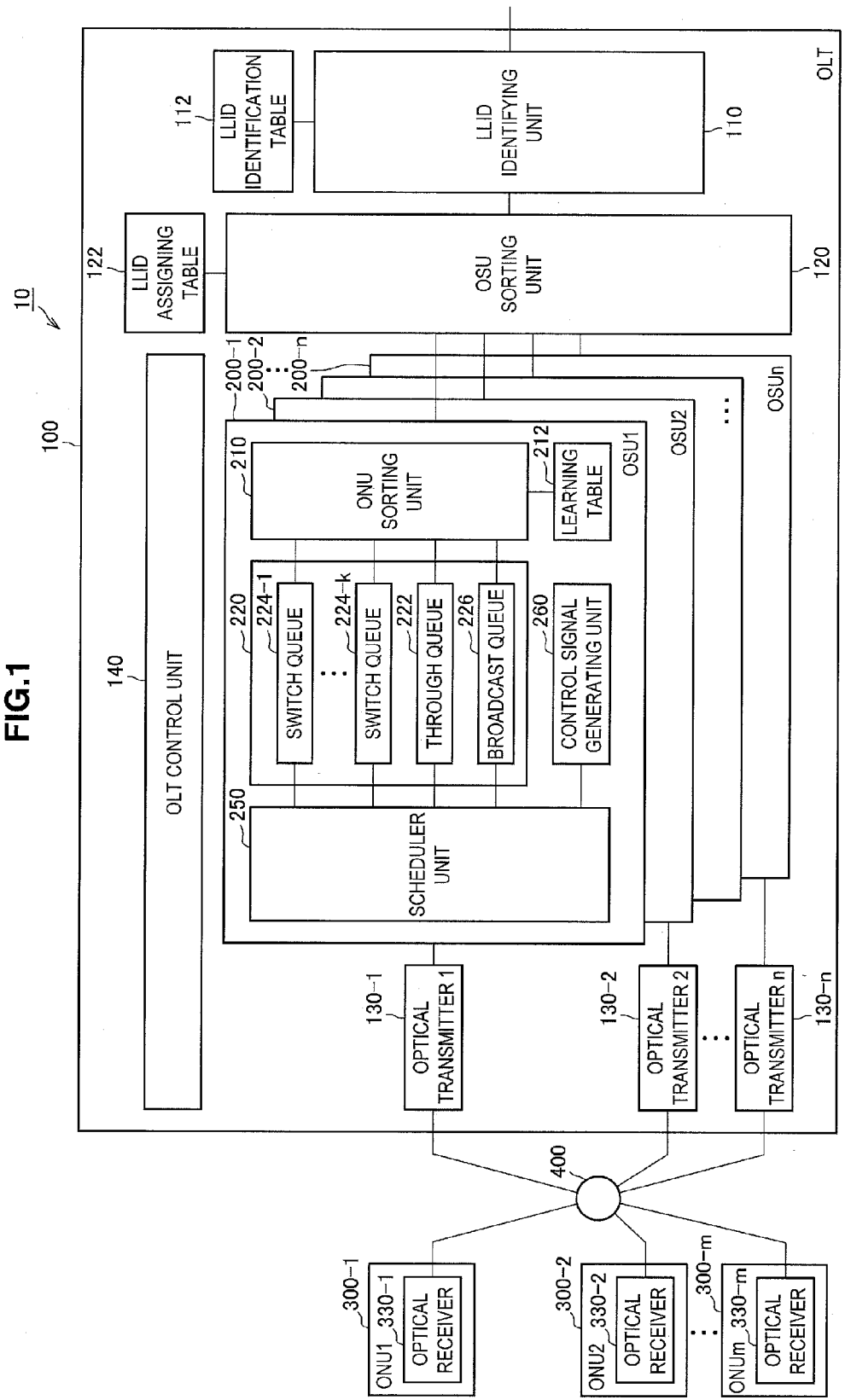
FIG. 1 is a schematic diagram for describing a TWDM-PON.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

With reference to FIG. 1, an exemplary configuration of a TVs/DM-PON including an OLT according to an embodiment of the present invention will be described. FIG. 1 is a schematic diagram for describing the TWDM-PON.

The TWDM-PON is an optical access network using a PON system. In the TWDM-PON, a downlink signal from the OLT to the ONU and an uplink signal from the ONU to the OLT are transmitted and received. Also, the uplink signal and the downlink signal include a data signal transmitted and received between the upstream network (not depicted) connected to the OLT and the user and the like terminal connected to the ONU (not depicted), and a control signal used to establish a PON link. Here, the data signal (hereinafter, also referred to as downlink packet) included in the downlink signal is described, and the description relevant to the control signal included in the uplink signal and the downlink signal is sometimes omitted.

The TWDM-PON 10 includes one OLT 100, a plurality of ONUs 300-1 to m (m is an integer equal to or greater than two), and an optical splitter 400 which is an optical passive element. The OLT 100 and the optical splitter 400 are connected by an optical fiber, and the ONUs 300-1 to m and the optical splitter 400 are connected by optical fibers.

The OLT 100 includes an LLID identifying unit 110, an OSU sorting unit 120, a plurality of OSUs 200-1 to n (n is an integer equal to or greater than two), a plurality of optical transmitting and receiving units 130-1 to n, an OLT control unit 140.

An LLID identifying unit 110 is connected to an OSU sorting unit 120. The LLID identifying unit 110 identifies the destination ONU, on the basis of the identification information of the downlink packet input from an upstream network. As the identification information of the downlink packet, for example, a VLAN ID (VID) included in the packet (frame) of the Ethernet (registered trademark) may be used. The LLID identifying unit 110 includes an LLID identification table 112 which associates the VID with a logical link ID (LLID). When the downlink packet is the unicast packet addressed to a specific ONU, an LLID is basically assigned to the connected ONU one by one. Hence, the LLID identifying unit 110 identifies a destination ONU 300 on the basis of the VID of the unicast packet, using the LLID identification table 112. The LLID identifying unit 110 adds the LLID assigned to the destination ONU 300 to the unicast packet, and transmits it to the OSU sorting unit 120.

On the other hand, when the downlink packet is a broadcast packet addressed to all the ONUs, the downlink packet includes a specific VID associated with the broadcast service, for example. The LLID identifying unit 110 identifies the downlink packet having the VID, as the broadcast packet. Note that, in another example, the destination address (MAC-DA) included in the packet (frame) of the Ethernet (registered trademark) may be used as the identification information of the broadcast packet. In this case, the LLID identifying unit 110 identifies it as the broadcast packet, from the fact that the MAC-DA is identical with the broadcast address. The ID identifying unit 110 adds a broadcast LLID (BC-LLID) to the broadcast packet, and transmits it to the OSU sorting unit 120.

The OSU sorting unit 120 is connected to a plurality of OSUs 200-1 to n. In the TWDM-PON 10, each of the ONUs 300-1 to m is registered in any of a plurality of OSUs 200-1 to n. The OSU sorting unit 120 includes a LLID assigning table 122 in which the LLID and the OSU correspond to each other. Note that, in the LLID assigning table 122, the BC-LLID is associated with the entire OSU. The OSU sorting unit 120 identifies the OSU 200 in which the destination ONU 300 is registered, on the basis of the LLID of the received downlink packet, using the LLID assigning table 122. The OSU sorting unit 120 transmits the unicast packet to the identified OSU 200. Also, when the BC-LLID is added to the received packet, the OSU sorting unit 120 recognizes that the packet is a broadcast packet. Then, the OSU sorting unit 120 copies the received broadcast packet, and transmits it to each of the OSUs 200-1 to n.

The OSUs 200-1 to n are connected to the optical transmitters 130-1 to n one by one. Also, to each of the optical transmitters 130-1 to n, the different wavelengths ($\lambda 1$ to $\lambda n$) are fixedly assigned. The optical transmitters 130-1 to n are connected to the ONUs 300-1 to m via the optical splitter 400.

The downlink packet input into the OSU 200 is transmitted to the destination ONU 300 via the connected optical transmitter 130, at the wavelength assigned to the optical transmitter 130. Here, since the OSUs 200-1 to n are connected to the optical transmitters 130-1 to n one by one, the transmission wavelength of the downlink packet is defined by the OSU in which the destination ONU is registered. Thus, in the following description, the wavelength assigned to the optical transmitters 130-1 to n connected to certain OSUs 200-1 to n is sometimes referred to as the wavelength assigned to the OSUs 200-1 to n.

Each of the OSUs 200-1 to n includes an ONU sorting unit 210, a buffer unit 220, a scheduler unit 250, and a control signal generating unit 260. The buffer unit 220 includes one through queue 222, one or more switch queues 224-1 to k (k is an integer equal to or greater than one), and one broadcast queue 226 in parallel. Note that the number k of the switch queues 224 corresponds to the number of path switches that are performable simultaneously. Thus, it is desirable that a plurality of switch queues 224 are provided. On the other hand, an increase of the number k of the switch queues 224 leads to the increase of the circuit size. Thus, it is desirable that the number k of the switch queues 224 is made smaller than the number of the ONU 300 that are registerable in each OSU 200, to prevent the increase of the circuit size.

The ONU sorting unit 210 transmits the unicast packet addressed to a specific ONU to the through queue 222 or the switch queues 224-1 to k. When the destination ONU of the packet is a non-switch target, the packet is transmitted to the through queue 222. Also, when the destination ONU of the packet is a switch target, the ONU sorting unit 210 transmits the packet, to one of the switch queues 224-1 to k. The ONU sorting unit 210 decides which switch queue to transmit the packet addressed to the switch target ONU, from among a plurality of switch queues with reference to the learning table 212. When the switch target ONU has not been learned, that is, when the switch target ONU is not registered in the learning table, the ONU sorting unit 210 transmits the packet to one of the unused switch queues 224. In this case, the ONU sorting unit 210 registers the switch queues 224 to which the packet is transmitted in the learning table 212, in order to learn it. When the switch target ONU has been learned, the ONU sorting unit 210 transmits the packet to the switch queues 224 registered in the learning table 212.

On the other hand, when the packet is the broadcast packet addressed to all the ONUs, the ONU sorting unit 210 transmits the packet, to the broadcast queue 226.

The control signal generation unit 260 generates a control signal, such as a gate, which is used to establish a PON link. A switch instruction of the reception wavelength in the ONU is performed by this control signal.

When the packet is input, the through queue 222, the broadcast queue 226, and the switch queues 224-1 to k issue a transmission request to the scheduler unit 250. The scheduler unit 250 adjusts the output in response to the transmission request of the downlink packet from each queue 222, 224-1 to k, 226, and the transmission request of the control signal from the control signal generating unit 260, and transmits the downlink signal to each ONU via the optical transmitters 130-1 to n.

The OLT control unit 140 controls the entire OLT and the OSU 200 equipped in the OLT 100. For example, the OLT control unit 140 rewrites the LLID identification table 112 and the LLID assigning table 122. Also, the OLT control unit 140 monitors the traffic through the OLT, and decides the time and content of path switching. Also, the OLT control unit 140 monitors the read from the scheduler unit of each OSU.

Also, when changing the OSU of the registration destination of the switch target ONU, the OLT control unit 140 notifies the release from the switching-source OSU, the registration to the switching-destination OSU, and the switch target ONU corresponding to the switching-destination OSU. Note that this notification may be instructed by the OLT control unit 140 directly to the OSU, or added to the packet transmitted to each OSU and transmitted.

The ONU 300 includes an optical receiver 330 that receives the downlink packet. The reception wavelength of the optical receiver is variable, and is set to receive the downlink packet of the wavelength assigned to the registered OSU.

Components that are not described above are configured in the same way as publicly known TWDM-PONs.

(First Path Switching Method)

Figure 2:
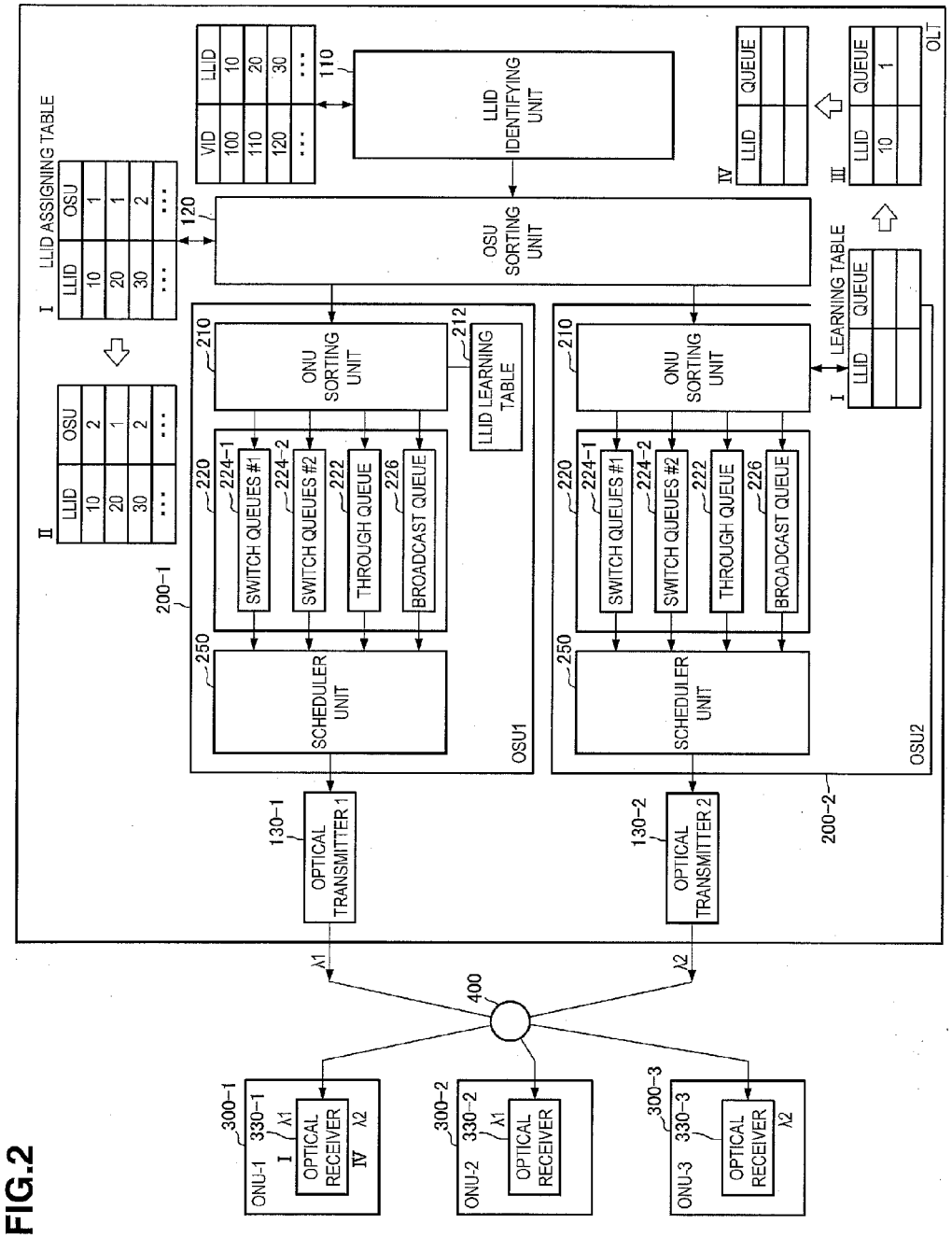
FIG. 2 is a schematic diagram for describing a path switching method.
Figure 3:
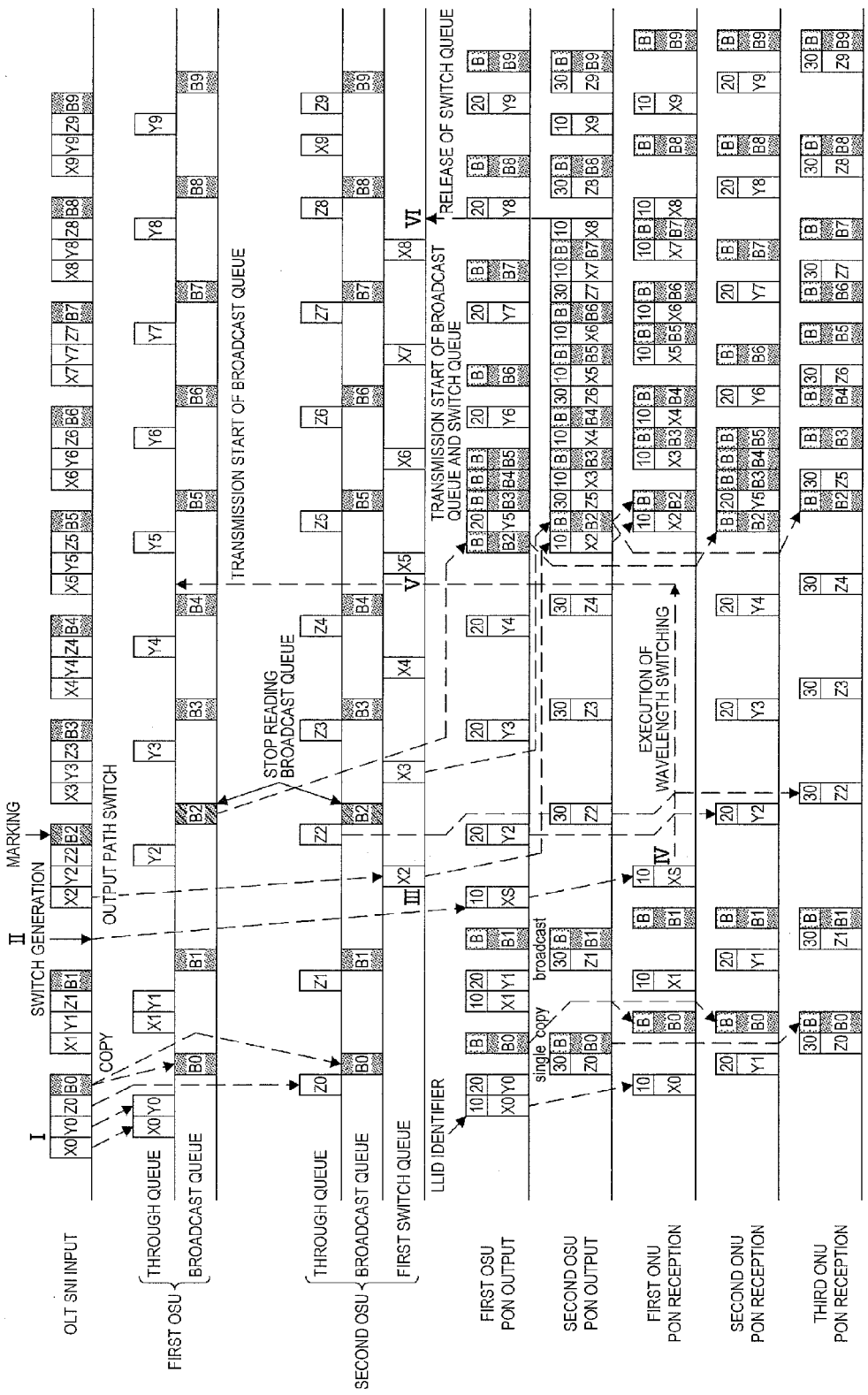
FIG. 3 is a schematic diagram for describing a first path switching method.

With reference to FIGS. 2 and 3, the first path switching method will be described. FIG. 2 is a schematic diagram for describing the path switching method. Here, the LLID of the first ONU is 10, and the LLID of the second ONU is 20, and the LLID of the third ONU is 30. That is, in the LLID identifying unit 110, the LLID=10 is assigned to the ONU=1, and the LLID=20 is assigned to the ONU=2, and the LLID=30 is assigned to the ONU=3. FIG. 3 is a time chart illustrating the flow until each downlink packet transmitted from the upstream network is received by the destination ONU. Here, the unicast packet addressed to the first ONU is indicated by X, and the unicast packet addressed to the second ONU is indicated by Y, and the unicast packet addressed to the third ONU is indicated by Z, and the broadcast packet is indicated by B.

At time I, the first ONU 300-1 and the second ONU 300-2 are registered in the first OSU 200-1. Also, the third ONU 300-3 is registered in the second OSU 200-2. That is, in the LLID assigning table 122, the OSU=1 is assigned to the LLID=10 and LLID=20. Also, the OSU=2 is assigned to the LLID=30. Thus, the OSU sorting unit 120 transmits the packet addressed to the first ONU 300-1 and the packet addressed to the second ONU 300-2 to the first OSU 200-1. These packets are transmitted to the first ONU 300-1 and the second ONU 300-2 as the downlink signal of the wavelength λ1 via the through queue of the first OSU 200-1, the scheduler unit, and the first optical transmitter 130-1. Also, the OSU sorting unit 120 transmits the packet addressed to the third ONU 300-3 to the second OSU 200-2. This packet is transmitted to the third ONU 300-3 as the downlink signal of the wavelength λ2 via the through queue of the second OSU 200-2, the scheduler unit, and the second optical transmitter 130-2.

On the other hand, the OSU sorting unit 120 copies the broadcast packet, and transmits it to each of the OSUs 200-1 and 200-2. The broadcast packet is transmitted via the broadcast queue of each of the OSUs 200-1 and 200-2, the scheduler unit, and the optical transmitters 130-1 and 130-2, at the wavelength assigned to each of the OSUs 200-1 and 200-2. Here, the OSU 200-1 transmits the broadcast packet to the first ONU 300-1 and the second ONU 300-2 as the downlink signal of the wavelength λ1. Also, the OSU 200-2 transmits the broadcast packet to the third ONU 300-3 as the downlink signal of the wavelength λ2. The broadcast packet transmitted from the OSUs 200-1 and 200-2 is diverged and copied at the optical splitter 400, and is transmitted to all the ONUs. The copy of the packet in the optical splitter 400 is defined in 10G-EPON (refer to IEEE (Institute of Electrical and Electronics Engineers) std 802. 3av-2009) as SCB (Single Copy Broadcast), for example. Each of the ONUs 300-1 to 3 receives the broadcast packet of the wavelength assigned to the registered OSU.

In the packet transmitted from the OSUs 200-1 and 200-2, an LLID identifier is included. Each of the ONUs 300-1 to 3 determines whether or not the packet is addressed to the ONU itself, on the basis of the LLID identifier of the received packet. In an example of FIG. 3, the LLID identifier=10 is given to the packet X addressed to the first ONU, and the LLID identifier=20 is given to the packet Y addressed to the second ONU, and the LLID identifier=30 is given to the packet Z addressed to the third ONU, with respect to the LLID assigned to each of the ONUs 300-1 to 3. Also, the LLID identifier=B, which indicates the destination is all the ONUs 300, is given to the broadcast packet B. For example, a LLID identifier giving unit, not depicted, gives the LLID identifier to the packet.

In the example illustrated in FIG. 3, the LLID identifier is given to the packet between the buffer unit 220 and the scheduler unit 250. When the LLID identifier is given to the packet at the stage after the buffer unit 220, the free space of each queue is prevented from being consumed by the LLID identifier.

Note that, in the present embodiment, all unicast packets addressed to the non-switch-target ONU are output from the through queue 222. Thus, when the LLID identifier is given at the stage after the buffer unit 220, the LLID identifier giving unit reads the VID of the packet output from the through queue 222, and gives the LLID identifier corresponding to the VID to the packet. Thus, the LLID identifier can be given to the packet between the ONU sorting unit 210 and the buffer unit 220. In that case, the LLID identifier giving unit is provided at a stage after the ONU sorting unit 210. Then, the LLID identifier giving unit gives the LLID identifier to each packet, on the basis of the LLID that the ONU sorting unit 210 has referred to when sorting the packets into each queue. As a result, the LLID is not read repeatedly at the stage after the buffer unit 220, to increase the throughput of communication.

Here, the registration destination of the first ONU 300-1 is switched from the first OSU 200-1 to the second OSU 200-2. This switch is performed for the purpose of communication load sharing, for example.

At time II, the OLT control unit 140 rewrites the LLID assigning table 122, and assigns the OSU=2 to the LLID=10. The packet addressed to the first ONU 300-1 transmitted from the upstream network to the OLT 100 after rewriting the LLID assigning table 122 is transmitted to the second OSU 200-2.

At this time point, since the reception wavelength is λ1, the first ONU 300-1 does not receive the downlink signal of the wavelength λ2 from the second OSU 200-2. Thus, the first OSU 200-1 instructs the first ONU 300-1 to switch the reception wavelength to λ2.

However, it is possible that the packets addressed to the first ONU 300-1 are accumulated in an untransmitted state in the first OSU 200-1. Also, it can take time to switch the reception wavelength at the first ONU 300-1.

Thus, it is preferable that the wavelength switching and its timing are instructed together to the first ONU 300-1, in consideration of the time for the wavelength switching of the first ONU 300-1, and the time until the packets addressed to the first ONU 300-1 accumulated in the first OSU 200-1 disappear. This instruction is performed by transmitting a control packet XS to the first ONU 300-1. The control packet XS includes notification of the wavelength switching, and information of a post-switch wavelength and switch timing. The control packet XS is generated at the control signal generating unit 260 (refer to FIG. 1), on the basis of the instruction of the OLT control unit 140.

At and after time II, upon receiving the packet addressed to the first ONU 300-1, the second OSU 200-2 determines whether or not the first ONU 300-1 is the switch target ONU. At time II, when rewriting the LLID assigning table, the OLT control unit 140 notifies the second OSU that the first ONU 300-1 is the switch target ONU. With this notification, the ONU sorting unit 210 recognizes that the first ONU 300-1 is the switch target ONU.

Subsequently, at time III, the ONU sorting unit 210 determines whether the first ONU 300-1 has been learned or has not been learned in the learning table 212. Here, since the first ONU 300-1 is not registered, it is determined that the first ONU 300-1 has not been learned. The ONU sorting unit 210 transmits the packet addressed to the ONU which has not been learned to one of the unused switch queues, and to cause the learning table to learn the switch queue. Here, a first switch queue is selected as the unused switch queue. The switch queue may be selected by selecting the unused switch queues, or by selecting in the order from a small number, or by selecting randomly.

After the first switch queue is selected, the packet addressed to the first ONU 300-1 is transmitted to the first switch queue 1, and 10 is registered in the LLID field of the learning table 212, and 1 is registered in the queue field. As a result, the first ONU 300-1 has been learned. After the first ONU 300-1 has been learned, the ONU sorting unit 210 transmits the packet addressed to the first ONU 300-1 to the first switch queue, with reference to the learning table 212.

On the other hand, the broadcast queue of each of the OSUs 200-1 and 200-2 stops the transmission of the broadcast packet that is input at or after time II. Here, for example, the broadcast packet (B2 in an example of FIG. 3) input into the broadcast queue for the first time at or after time II is marked, in order to confirm from which broadcast packet the transmission is stopped. The broadcast packets after the broadcast packet B2 are accumulated in the broadcast queue.

Next, at time IV, the switch of the reception wavelength of the first ONU is started. The timing of the wavelength switching is adjusted, so that the packets addressed to the first ONU accumulated in the first OSU disappear until this time IV. After the switch of the reception wavelength is completed at the first ONU at time V, the second OSU transmits a control signal, such as a gate signal, to the first ONU, and receives an acknowledgment from the first ONU. Thereby, a link between the second OSU and the first ONU is established.

Thereafter, the scheduler unit of the first OSU 200-1 transmits the broadcast packets accumulated in the broadcast queue to the second ONU. On the other hand, the scheduler unit of the second OSU 200-2 transmits the packets accumulated in the first switch queue to the first ONU, and the broadcast packets accumulated in the broadcast queue to the first ONU and the third ONU.

At time VI, the packets accumulated in the first switch queue disappear, and the learning entry is released. The release of the learning entry is conducted by deleting the first ONU and the first switch queue from the learning table. Also, the first ONU 300-1 is set as a non-switch target.

Here, FIG. 3 illustrates an example in which, at or after time V, the scheduler unit of the second OSU 200-2 sequentially reads the packet from the first switch queue, the through queue, and the broadcast queue. However, for example, the scheduler unit may read from the first switch queue on a priority basis. In that case, since the packets accumulated in the first switch queue immediately disappear, the learning entry is released promptly. Further, the scheduler unit may read not only from the first switch queue, but also from the broadcast queue on a priority basis. In that case, the learning entry is released promptly, and the delay of broadcast packet is eliminated.

After the learning entry is released, and the first ONU 300-1 becomes non-switch target, the packet addressed to the first ONU 300-1 is transmitted to the second optical transmitter via the through queue of the second OSU 200-2, and the scheduler unit.

Note that, when the registration destination of the second ONU 300-2 is changed from the first OSU 200-1 to the second OSU 200-2 while the path switching of the first ONU 300-1 is performed, the path switching may be performed by the procedure described above. In this case since the first switch queue has been used, the second switch queue is used as the unused switch queue. Note that the OLT control unit 140 monitors the progress status of the path switching, and simultaneously limits the number of the ONUs that perform the wavelength switching to a number equal to or smaller than the number of the switch queues.

According to the OLT and the first path switching method according to an embodiment of the present invention, the number of the ONUs that perform a switching process simultaneously is limited to make the switch queues for storing the packets during switch processing to be fewer than the number of the contained ONUs. Also, since the queue number is reduced, the memory amount for address management of the buffer is reduced. Thereby, an OLT capable of switching without consuming time is provided economically.

Although, in the above example, one switch queue is used for one switch target ONU, the configuration is not limited thereto. For example, path switching of a plurality of ONUs having a same wavelength switching time period may be performed using one switch queue.

Also, according to the OLT and the first path switching method in an embodiment of the present invention, the broadcast packets is accumulated in the broadcast queue, while path switching of the ONU is performed. Hence, while providing the broadcast service, path switching of the ONU is performed without discarding the broadcast packet.

Although the TWDM-PON has been described as an example, the OLT and the first path switching method according to an embodiment of the present invention may be employed in widely-used networks to perform path switching for load sharing, and switching to a redundant path without consuming a time when a failure occurs.

(Second Path Switching Method)

Figure 4:
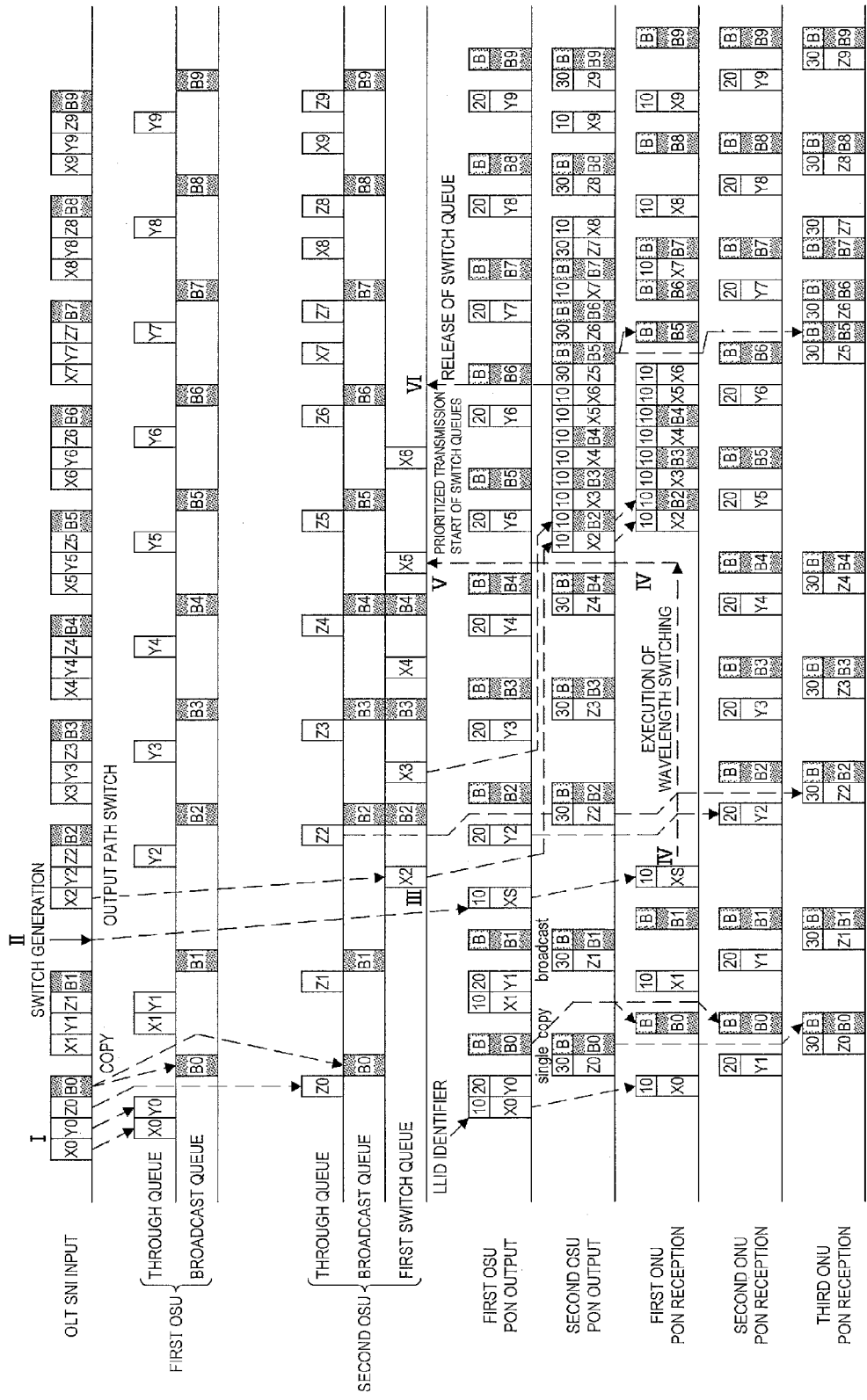
FIG. 4 is a schematic diagram for describing a second path switching method.

With reference to FIGS. 2 and 4, the second path switching method will be described. FIG. 4 is a time chart illustrating the flow until each downlink packet transmitted from the upstream network is received by the destination ONU. Here, in the same way as the first path switching method described above, the unicast packet addressed to the first ONU is indicated by X, and the unicast packet addressed to the second ONU is indicated by Y, and the unicast packet addressed to the third ONU is indicated by Z, and the broadcast packet is indicated by B.

Note that the second path switching method is different from the first path switching method described above, in the process for the broadcast packet at or after time II. The process for the unicast packet and the broadcast packet at time I, the process for the unicast packet at or after time II, and other descriptions that overlap the first path switching method will be omitted.

Also, here, in the same way as the first path switching method described above, description will be made of an example in which the registration destination of the first ONU 300-1 is switched from the first OSU 200-1 to the second OSU 200-2. Thus, at time II, the OLT control unit 140 rewrites the LLID assigning table 122, and assigns the OSU=2 to the LLID=10. The packet addressed to the first ONU 300-1 transmitted from the upstream network to the OLT 100 after rewriting the LLID assigning table 122 is transmitted to the second OSU 200-2.

The ONU sorting unit of the second OSU 200-2 copies the broadcast packet input at or after time II, and transmits it to the broadcast queue and all the learned switch queues. Note that, when the broadcast packet is input into the ONU sorting unit, and there is an ONU which is the switch target and has not been learned, one of the copied broadcast packets is transmitted to one of the unused switch queues. Then, the switch queues is learned by the learning table. Here, at time III, the first switch queue is assigned to the first ONU which is the switch target. Thus, the broadcast packet input into the ONU sorting unit at or after time III is copied at the ONU sorting unit, and is transmitted to the broadcast queue and the first switch queue. When there are a plurality of ONUs that are the switch targets and have not been learned, transmission of the copied broadcast packet to the unused switch queue, and learning of the switch queues in the learning table are performed a number of times of the ONUs.

On the other hand, the ONU sorting unit of the first OSU 200-1 transmits the broadcast packet to the broadcast queue.

As for both of the first OSU 200-1 and the second OSU 200-2, the broadcast packets transmitted to the broadcast queue are not accumulated, but read by the scheduler unit. Then, the broadcast packets are transmitted to the ONU via the optical transmitter.

Next, at time IV, the switch of the reception wavelength of the first ONU is started. In the same way as the first path switching method described above, the timing of the wavelength switching is adjusted, so that the packets addressed to the first ONU accumulated in the first OSU disappear until this time IV. Also, at time IV, the first ONU stops receiving the broadcast packet, so as not to receive the broadcast packet which is erroneously transmitted from the first OSU 200-1 while wavelength switching is executed. After the switch of the reception wavelength is completed at the first ONU at time V, the second OSU transmits a control signal, such as a gate signal, to the first ONU, and receives an acknowledgment from the first ONU. Thereby, a link between the second OSU and the first ONU is established. Also, at time V, the first ONU starts receiving the broadcast packet.

Thereafter, the scheduler unit of the second OSU 200-2 transmits the unicast packets and the broadcast packets accumulated in the first switch queue to the first ONU. Note that, in the same way as the unicast packet, the broadcast packets accumulated in the first switch queue are given an LLID identifier (here, LLID identifier=10) addressed to the first ONU, and are transmitted.

Also, here, the scheduler unit of the second OSU 200-2 reads from the first switch queue on a priority basis. Thus, as illustrated in FIG. 4, the unicast packets and the broadcast packets accumulated in the first switch queue are sequentially output from the second OSU 200-2. As a result, the learning entry is released promptly, and the delay of the broadcast packet addressed to the first ONU is eliminated.

At time VI, the packets accumulated in the first switch queue disappear, and the learning entry is released. The release of the learning entry is conducted by deleting the first ONU and the first switch queue from the learning table. Also, the first ONU 300-1 is set as a non-switch target. After the release of the learning entry, the prioritized read operation from the first switch queue stops, and the packets are sequentially read from the through queue and the broadcast queue, and are transmitted.

After the learning entry is released, and the first ONU 300-1 becomes non-switch target, the packet addressed to the first ONU 300-1 is transmitted to the second optical transmitter via the through queue of the second OSU 200-2, and the scheduler unit.

Note that, when the registration destination of the second ONU 300-2 is changed from the first OSU 200-1 to the second OSU 200-2 while the path switching of the first ONU 300-1 is performed, the path switching may be performed by the procedure described above. In this case, since the first switch queue has been used, the second switch queue is used as the unused switch queue. Note that the OLT control unit 140 monitors the progress status of the path switching, and simultaneously limits the number of the ONUs that perform the wavelength switching to a number equal to or smaller than the number of the switch queues.

According to the second path switching method of an embodiment of the present invention, path switching of the ONU is performed without discarding the broadcast packet, while providing the broadcast service, in the same way as the first path switching method described above. Further, in the second path switching method, the transmission of the broadcast packet to the non-switch-target ONU does not stop, during the path switching of the ONU. Hence, the delay fluctuation of the broadcast packet to the non-switch-target ONU is prevented.

Here, in the second path switching method, the broadcast packet is transmitted to both of the broadcast queue and the switch queue in the switching-destination OSU, while the path switching of the ONU is performed. Hence, in the second path switching method, the ONU sorting unit copies the broadcast packet. In contrast, in the first path switching method, the broadcast packet is transmitted to the broadcast queue only, even when the path switching of the ONU is performed. Hence, the ONU sorting unit does not copy the broadcast packet. The increase of procedure for copying the broadcast packet leads to complication of the device. Thus, in view of feasibility of the device, the first path switching method is advantageous.

On the other hand, in the first path switching method, the transmission of the broadcast packet to all the ONUs including the non-switch-target ONU stops, while the path switching of the ONU is performed. In contrast, in the second path switching method, the transmission of the broadcast packet to the non-switch-target ONU does not stop. In order to eliminate the delay fluctuation of the broadcast packet, the second path switching method is advantageous.

Whether to employ the first path switching method or the second path switching method can be decided as appropriate, depending on the environment for providing the service.

Note that, in the second path switching method according to an embodiment of the present invention, the communication is performed without using the broadcast queue 226. That is, at a time the path switching of the ONU is not performed (for example, time I of FIG. 4), each OSU transmits the broadcast packet via the through queue. While the path switching of the ONU is performed (for example, time IV to V of FIG. 4), the switching-destination OSU transmits the broadcast packet to the non-switch-target ONU via the through queue. As described above, the second path switching method described above is performed, by designing such that the broadcast packet passes through the through queue in the buffer unit. Thus, in this case, the broadcast queue 226 can be omitted from the OLT 100 illustrated in FIG. 1.

(Application for Multicast Packet)

The OLT and the first and second path switching methods according to an embodiment of the present invention can be also employed in the communication using the multicast LLID defined by SIEPON (Service Interoperability in Ethernet Passive Optical Network).

Figure 5:
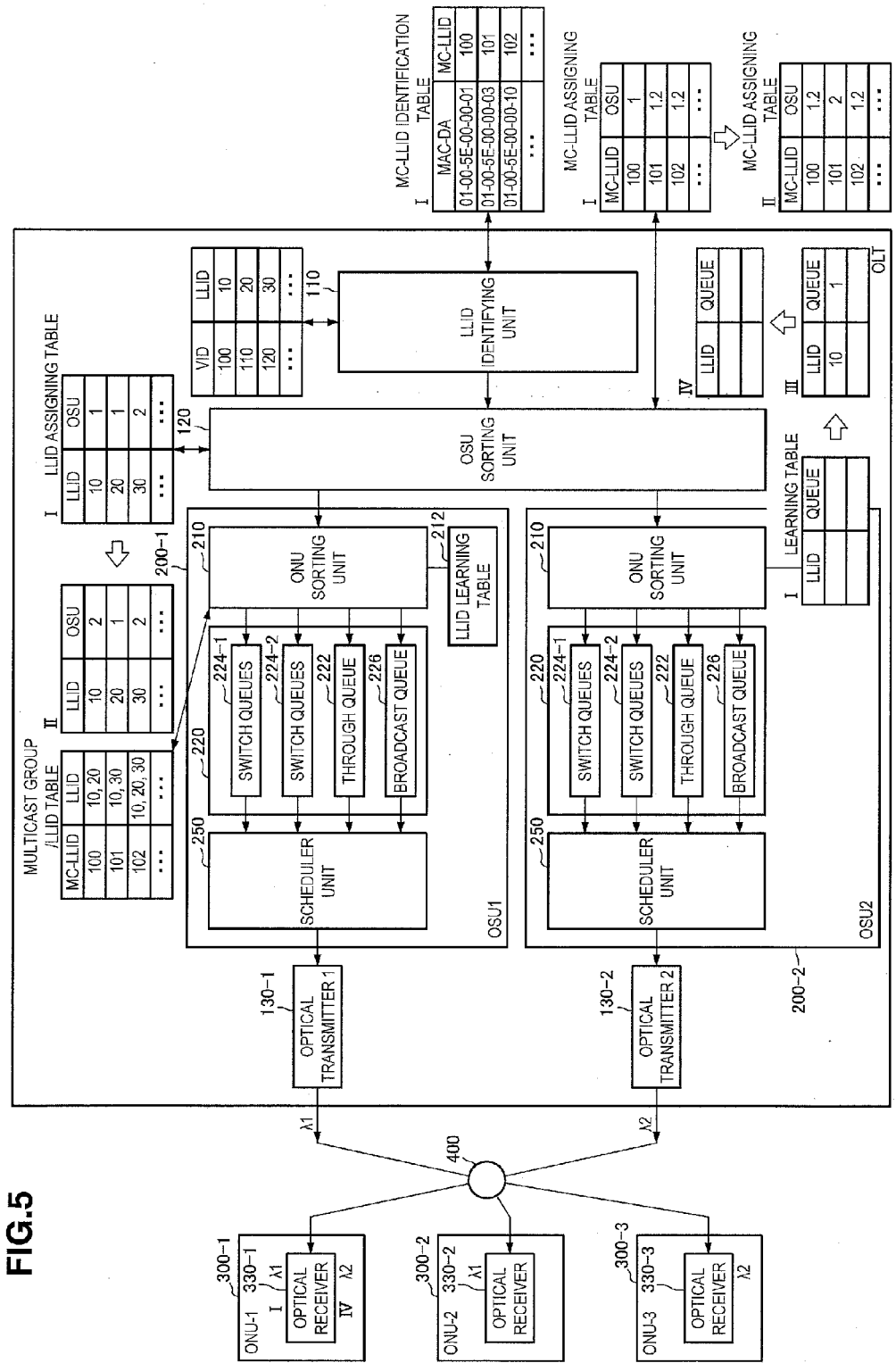
FIG. 5 is a schematic diagram for describing an OLT and a path switching method when a multicast packet communication is employed.

With reference to FIG. 5, description will be made of a case where the communication of the multicast packet is employed in the OLT according to an embodiment of the present invention. FIG. 5 is the schematic diagram for describing the OLT and the path switching method when the communication of the multicast packet is employed.

The multicast packet is a packet transmitted to a plurality of specific ONUs, among the ONUs registered in the OLT. The multicast packet is given a multicast LLID (MC-LLID), which indicates that it is addressed to a plurality of specific ONUs, and is transmitted. Note that the group of a plurality of ONUs that receive a common multicast packet is referred to as multicast group.

In the OLT according to an embodiment of the present invention, when the communication of the multicast packet is employed, each of the LLID identifying unit 110 and the OSU sorting unit 120 additionally includes a table for deciding the transmission destination of the multicast packet.

The LLID identifying unit 110 identifies the destination ONU on the basis of the identification information of the multicast packet input from the upstream network. As the identification information of the multicast packet, a destination address of MAC (MAC-DA) may be used. The LLID identifying unit 110 includes a MC-LLID identification table which associates the MAC-DA with the logical link ID (LLID). For example, this table is registered by the operator and the like when providing the multicast service. Basically, the MC-LLID is assigned to the multicast group one by one. Hence, the LLID identifying unit 110 identifies the multicast group of the destination on the basis of the MAC-DA of the multicast packet, using the MC-LLID identification table. The LLID identifying unit 110 adds the MC-LLID assigned to the multicast group of the destination to the downlink packet, and transmits it to the OSU sorting unit 120. Note that, here, although description has been made of an example which identifies the multicast group of the destination from the MAC-DA, the multicast group of the destination can be identified using the VID as the identification information, for example. In that case, a table that associates the VID with the MC-LLID may be used.

The OSU sorting unit 120 includes an MC-LLID assigning table that associates the MC-LLID with the OSU. The OSU sorting unit 120 identifies the LLID of the ONU that belongs to the multicast group of the destination, on the basis of the MC-LLID of the received multicast packet, using the MC-LLID assigning table. On the basis of the result, the OSU sorting unit 120 identifies the OSU 200 in which the ONU that belongs to the multicast group of the destination is registered. The OSU sorting unit 120 transmits the downlink packet to the identified OSU 200. Note that, when the multicast group of the destination includes the ONUs registered in the different OSU 200, the OSU sorting unit 120 copies the multicast packet, and transmits the multicast packet to all the OSUs 200 in which the ONU that belongs to the multicast group of the destination is registered.

The operation of the ONU sorting unit 210 is different, depending on which one of the first path switching method and the second path switching method described above is employed.

When employing the first path switching method, the ONU sorting unit 210 transmits the multicast packet to the broadcast queue.

On the other hand, when employing the second path switching method, the ONU sorting unit 210 includes a multicast group/LLID table which associates the MC-LLID with the ONU that belongs to the multicast group of the destination. The ONU sorting unit 210 identifies the LLID of the ONU that belongs to the multicast group of the destination, from the MC-LLID of the received multicast packet, using the multicast group/LLID table. When the multicast group of the destination of the multicast packet does not include the switch target ONU, the ONU sorting unit 210 transmits the packet to the broadcast queue. In contrast, when the multicast group of the destination of the multicast packet includes the switch target ONU, the ONU sorting unit 210 transmits the packet to the broadcast queue and one of the switch queues 224-1 to k. To which one of a plurality of switch queues the ONU sorting unit 210 transmits the packet addressed to the multicast group including the switch target ONU is decided with reference to the learning table in the same way as the unicast packet.

Here, the ONU configuring the multicast group dynamically changes depending on the request status from the user which belongs to each ONU. Hence, in the MC-LLID assigning table and the multicast group/LLID table described above, a large memory is necessary to make a list of all the MC-LLIDs and all the LLIDs of the ONU that belongs to the multicast group. Thus, in order to realize the MC-LLID assigning table and the multicast group/LLID table by a small memory, it is envisaged that the LLID assigned to each ONU is configured by a bit sequence, and the MC-LLID is configured on the basis of the bit sequence. Below table 1 illustrates an example in which the LLID is configured by the bit sequence.

| LLID | BIT SEQUENCE | ONU |
| --- | --- | --- |
| 10 | . . . 0001 | 1 |
| 20 | . . . 0010 | 2 |
| 30 | . . . 0100 | 3 |
| . . . | . . . | . . . |

The number of digits of the bit sequence configuring the LLID corresponds to the maximum number of the ONUs connectable to the OLT. Then, for example, the bit of the first digit is assigned to the first ONU (LLID=10), and the bit of the second digit is assigned to the second ONU (LLID=20), and the bit of the third digit is assigned to the third ONU (LLID=30). Then, the MC-LLID is configured by the sum of the bit sequence configuring these LLIDs. For example, the MC-LLID=100 of the multicast group that the first ONU and the second ONU belongs to is configured by a bit sequence 0011. Such correspondence relationship between the LLID and the MC-LLID and the bit sequence is stored in the OSU sorting unit 120 and the ONU sorting unit 210, so as to associate the MC-LLID with the LLID as in the MC-LLID assigning table and the multicast group/LLID table illustrated in FIG. 5. In this case, the OSU sorting unit 120 and the ONU sorting unit 210 do not make a list of the MC-LLID and the LLID. Hence, the MC-LLID assigning table and the multicast group/LLID table is configured by a small memory.

As described above, the OLT additionally includes the table for deciding the transmission destination of the multicast packet, to thereby apply the OLT according to an embodiment of the present invention in the communication of the multicast packet. Thus, the first and second path switching methods described above are employed.

Next, with reference to FIG. 5, description will be made of the path switching method when the communication of the multicast packet is employed, in the OLT according to an embodiment of the present invention.

The MC-LLID of the multicast packet addressed to the multicast group that the first ONU (LLID=10) and the second ONU (LLID=20) belong to is set at 100. Also, the MC-LLID of the multicast packet addressed to the multicast group that the first ONU and the third ONU (LLID=30) belong to is set at 101. Also, the MC-LLID of the multicast packet addressed to the multicast group that the first ONU, the second ONU, and the third ONU belong to is set at 102. That is, in the LLID identifying unit 110, the ONUs=1, 2 are assigned to the MC-LLID=100, and the ONUs=1, 3 are assigned to the MC-LLID=101, and the ONUs=1, 2, 3 are assigned to the MC-LLID=102.

At time I, the first ONU 300-1 and the second ONU 300-2 are registered in the first OSU 200-1. Also, the third ONU 300-3 is registered in the second OSU 200-2. That is, in the MC-LLID assigning table, the OSU=1 is assigned to the MC-LLID=100. Also, the OSUs=1, 2 are assigned to the MC-LLID=101 and the MC-LLID=102. Thus, the OSU sorting unit 120 transmits the multicast packet addressed to the first ONU 300-1 and the second ONU 300-2 to the first OSU 200-1. This multicast packet is transmitted to the first ONU 300-1 and the second ONU 300-2 via the broadcast queue 226 of the first OSU 200-1, the scheduler unit 250, and the first optical transmitter 130-1, as the downlink signal of the wavelength λ1. On the other hand, the OSU sorting unit 120 copies the multicast packet addressed to the first ONU 300-1 and the third ONU 300-3, and the multicast packet of the first ONU 300-1, the second ONU 300-2, and the third ONU 300-3, and transmits them to the first OSU 200-1 and the second OSU 200-2. Each multicast packet transmitted to the first OSU 200-1 and the second OSU 200-2 is transmitted via the broadcast queue of each of the OSUs 200-1 and 200-2, the scheduler unit, and the optical transmitter, at the wavelength assigned to each of the OSUs 200-1 and 200-2. Here, the OSU 200-1 transmits the multicast packet, to the first ONU 300-1 and the second ONU 300-2, as the downlink signal of the wavelength λ1. Also, the OSU 200-2 transmits the multicast packet, to the third ONU 300-3, as the downlink signal of the wavelength λ2.

The multicast packet transmitted from the OSUs 200-1 and 200-2 is diverged and copied at the optical splitter 400, and is transmitted to the ONU that belongs to the multicast group of the destination. Each of the ONUs 300-1 to 3 receives the multicast packet of the wavelength assigned to the registered OSU.

The LLID identifier according to the multicast group is given to the multicast packet transmitted from the OSUs 200-1 and 200-2. Each of the ONUs 300-1 to 3 determines whether or not the packet is addressed to the ONU itself, on the basis of the LLID identifier of the received multicast packet.

Here, the registration destination of the first ONU 300-1 is switched from the first OSU 200-1 to the second OSU 200-2.

At time II, the OLT control unit 140 rewrites the MC-LLID assigning table, to assign the OSUs=1, 2 to the MC-LLID=100. Also, the OLT control unit 140 rewrites the MC-LLID assigning table, to assign the OSU=2 to the MC-LLID=101. The multicast packets addressed to the first ONU 300-1 and the second ONU 300-2 transmitted to the OLT 100 from the upstream network after rewriting the MC-LLID assigning table are copied and transmitted to the first OSU 200-1 and the second OSU 200-2. Also, the multicast packets addressed to the first ONU 300-1 and the third ONU 300-3 are transmitted to the second OSU 200-2.

At or after time II, how to sort the multicast packet to each queue by the ONU sorting unit 210 is different depending on whether the aforementioned first path switching method or second path switching method is employed.

When employing the first path switching method, the ONU sorting unit 210 transmits the multicast packet to the broadcast queue. Then, the broadcast queue stops the transmission of the multicast packets input at or after time II. Thus, the multicast packets input at or after time II are accumulated in the broadcast queue.

On the other hand, when employing the second path switching method, upon receiving the multicast packet at or after time II, the first OSU 200-1 and the second OSU 200-2 determine whether or not the switch target ONU belongs to the multicast group of the destination.

At time II, when rewriting the LLID assigning table, the OLT control unit 140 notifies the second OSU that the first ONU 300-1 is the switch target ONU. With this notification, the ONU sorting unit 210 recognizes that the first ONU 300-1 is the switch target ONU. Then, when the first ONU 300-1 belongs to the multicast group of the destination, the ONU sorting unit copies the multicast packet, and transmits it to the broadcast queue and all the learned switch queues. Note that, when the multicast packet is input into the ONU sorting unit, and the switch target ONU that belongs to the multicast group has not been learned, one copied multicast packet is transmitted to one of the unused switch queues. Then, the learning table learns the switch queue. When there are a plurality of ONUs which are the switch targets that belong to the multicast group and have not been learned, the transmission to the unused switch queues of the copied multicast packet, and the learning of the switch queues in the learning table is performed a number of times of the ONUs. The multicast packets transmitted to the broadcast queue are not accumulated, but read by the scheduler unit. Then, the multicast packets are transmitted to the ONU via the optical transmitter.

The operation at or after time IV, i.e. at or after the switching of the reception wavelength of the first ONU is started, is same as the first path switching method and second the path switching described above.

As described above, according to the OLT and the first path switching method and the second path switching method according to an embodiment of the present invention, path switching of the ONU is performed without discarding the multicast packet, in the same way as the broadcast packet.

Note that, when employing the second path switching method, the communication is performed without using the broadcast queue 226. That is, at a time when the path switching of the ONU is not performed, each OSU transmits the multicast packet, via the through queue. While the path switching of the ONU is performed, the switching-destination OSU transmits the multicast packet to the non-switch-target ONU via the through queue. As described above, the second path switching method described above is performed, by designing such that the multicast packet passes through the through queue in the buffer unit. Thus, when employing the second path switching method, the broadcast queue 226 is omitted from the OLT 100 illustrated in FIG. 1.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A station-side terminal apparatus comprising:
   a plurality of terminal devices, each including
   a buffer unit including a through queue, a broadcast queue, and one or more switch queues,
   a subscriber-side terminal apparatus sorting unit configured to transmit a unicast packet addressed to a switch-target subscriber-side terminal apparatus to the switch queues, and transmit a packet addressed to a plurality of subscriber-side terminal apparatuses to the broadcast queue, and transmit a unicast packet addressed to a non-switch-target subscriber-side terminal apparatus to the through queue, and
   a scheduler unit configured to read a packet from the switch queues, the broadcast queue, and the through queue; and
   a terminal device sorting unit configured to transmit a received unicast packet to the terminal device in which a subscriber-side terminal apparatus of a destination of the unicast packet is registered, and transmit a received packet addressed to a plurality of subscriber-side terminal apparatuses, to each of the terminal devices in which the subscriber-side terminal apparatuses of destinations of the packet are registered.

2. The station-side terminal apparatus according to claim 1, wherein
   the subscriber-side terminal apparatus sorting unit decides a queue of a transmission destination with reference to a learning table which associates the switch-target subscriber-side terminal apparatus with the switch queue, and
   when a subscriber-side terminal apparatus of a destination of a unicast packet is a non-switch-target subscriber-side terminal apparatus, transmits the packet to the through queue, and
   when the subscriber-side terminal apparatus of the destination of the unicast packet is a switch-target subscriber-side terminal apparatus, and the switch queues is registered in the learning table, transmits the packet to the registered switch queue, and
   when the subscriber-side terminal apparatus of the destination of the unicast packet is a switch-target subscriber-side terminal apparatus, and the switch queue is not registered in the learning table, transmits the packet to the unused switch queue, and registers the switch queue in the learning table, and
   when a packet is a packet addressed to a plurality of subscriber-side terminal apparatuses, transmits the packet to the broadcast queue.

3. The station-side terminal apparatus according to claim 1, wherein
   the subscriber-side terminal apparatus sorting unit decides a queue of a transmission destination with reference to a learning table which associates the switch-target subscriber-side terminal apparatus with the switch queue, and
   when a subscriber-side terminal apparatus of a destination of a unicast packet is a non-switch-target subscriber-side terminal apparatus, transmits the packet to the through queue, and
   when the subscriber-side terminal apparatus of the destination of the unicast packet is a switch-target subscriber-side terminal apparatus, and the switch queues is registered in the learning table, transmits the packet to the registered switch queue, and
   when the subscriber-side terminal apparatus of the destination of the unicast packet is a switch-target subscriber-side terminal apparatus, and the switch queue is not registered in the learning table, transmits the packet to the unused switch queue, and registers the switch queue in the learning table, and
   when a packet is a packet addressed to a plurality of subscriber-side terminal apparatuses, and destinations of the packet do not include a switch-target subscriber-side terminal apparatus, transmits the packet to the broadcast queue, and when a packet is a packet addressed to a plurality of subscriber-side terminal apparatuses, and destinations of the packet include a switch-target subscriber-side terminal apparatus, and the switch queues for all switch-target subscriber-side terminal apparatuses included in the destinations of the packet are registered in the learning table, transmits the packet to the broadcast queue and all switch queues registered in the learning table, and
   when a packet is a packet addressed to a plurality of subscriber-side terminal apparatuses, and destinations of the packet include a switch-target subscriber-side terminal apparatus, and the switch-target subscriber-side terminal apparatus included in the destinations of the packet includes a subscriber-side terminal apparatus for which the switch queue is not registered in the learning table, transmits the packet to the broadcast queue, all switch queues registered in the learning table, and the unused switch queue, and registers the unused switch queue in the learning table.

4. The station-side terminal apparatus according to claim 1, wherein
   a number of the switch queues is smaller than a number of subscriber-side terminal apparatuses that are registerable in the terminal device.

5. The station-side terminal apparatus according to claim 1, wherein
   a number of subscriber-side terminal apparatuses that simultaneously switch wavelengths is equal to or smaller than a number of the switch queues.

6. The station-side terminal apparatus according to claim 1, further comprising
   a station-side terminal apparatus control unit,
   wherein the terminal device sorting unit decides a terminal device of a transmission destination of a received unicast packet and a packet addressed to a plurality of subscriber-side terminal apparatuses, with reference to a table which associates a subscriber-side terminal apparatus with a terminal device in which the subscriber-side terminal apparatus is registered, and
   the station-side terminal apparatus control unit instructs each of the terminal devices a release from a switching-source terminal device and a registration to a switching-destination terminal device with respect to a switch-target subscriber-side terminal apparatus, and rewrites a LLID assigning table.

7. A path switching method of a station-side terminal apparatus, connected to a subscriber-side terminal apparatus, that includes a plurality of terminal devices, each including, a buffer unit including a through queue, a broadcast queue, and one or more switch queues, a subscriber-side terminal apparatus sorting unit configured to transmit a unicast packet addressed to a switch-target subscriber-side terminal apparatus to the switch queues, and transmit a packet addressed to a plurality of subscriber-side terminal apparatuses to the broadcast queue, and transmit a unicast packet addressed to a non-switch-target subscriber-side terminal apparatus to the through queue, a scheduler unit configured to read a packet from the switch queues, the broadcast queue, and the through queue, and a learning table configured to associate the switch-target subscriber-side terminal apparatus with the switch queue; and a terminal device sorting unit configured to transmit a received unicast packet to the terminal device in which a subscriber-side terminal apparatus of a destination of the unicast packet is registered, and transmit a received packet addressed to a plurality of subscriber-side terminal apparatuses, to each of the terminal devices in which the subscriber-side terminal apparatuses of destinations of the packet are registered, and a station-side terminal apparatus control unit configured to control correspondence between the subscriber-side terminal apparatus and the plurality of terminal devices, the path switching method comprising:
changing, by the station-side terminal apparatus control unit, a transmission destination of a unicast packet addressed to a switch-target subscriber-side terminal apparatus from a switching-source terminal device to a switching-destination terminal device;
transmitting, by a subscriber-side terminal apparatus sorting unit of a switching-destination terminal device, a unicast packet addressed to the subscriber-side terminal apparatus to a learned switch queue, when a switch-target subscriber-side terminal apparatus has been learned, with reference to a learning table;
transmitting, by the subscriber-side terminal apparatus sorting unit, a unicast packet addressed to the subscriber-side terminal apparatus to an unused switch queue, and registering the switch queue in the learning table, when a switch-target subscriber-side terminal apparatus has not been learned;
transmitting, by a subscriber-side terminal apparatus sorting unit of each of the terminal devices, a packet addressed to a plurality of subscriber-side terminal apparatuses to the broadcast queue;
starting, by a switching-destination terminal device, transmission addressed to a switch-target subscriber-side terminal apparatus, and starting, by each of the terminal devices, a transmission of a packet addressed to a plurality of subscriber-side terminal apparatuses, after an amount of packets addressed to a switch-target subscriber-side terminal apparatus accumulated in the switching-source terminal device becomes zero; and
releasing a switch-target subscriber-side terminal apparatus from the learning table, and transmitting a unicast packet addressed to a switch-target subscriber-side terminal apparatus via the through queue, after the amount of unicast packets addressed to a switch-target subscriber-side terminal apparatus accumulated in the switch queue becomes zero.

8. The path switching method according to claim 7, wherein
when a transmission destination of a unicast packet addressed to the switch-target subscriber-side terminal apparatus is changed from a switching-source terminal device to a switching-destination terminal device,
a transmission destination of a packet addressed to a plurality of subscriber-side terminal apparatuses whose destinations include the switch-target subscriber-side terminal apparatus includes a switching-destination terminal device.

9. A path switching method of a station-side terminal apparatus connected to a subscriber-side terminal apparatus, that includes a plurality of terminal devices, each including, a buffer unit including a through queue, a broadcast queue, and one or more switch queues, a subscriber-side terminal apparatus sorting unit configured to transmit a unicast packet addressed to a switch-target subscriber-side terminal apparatus to the switch queues, and transmit a packet addressed to a plurality of subscriber-side terminal apparatuses to the broadcast queue, and transmit a unicast packet addressed to a non-switch-target subscriber-side terminal apparatus to the through queue, a scheduler unit configured to read a packet from the switch queues, the broadcast queue, and the through queue, and a learning table configured to associate the switch-target subscriber-side terminal apparatus with the switch queue; and a terminal device sorting unit configured to transmit a received unicast packet to the terminal device in which a subscriber-side terminal apparatus of a destination of the unicast packet is registered, and transmit a received packet addressed to a plurality of subscriber-side terminal apparatuses, to each of the terminal devices in which the subscriber-side terminal apparatuses of destinations of the packet are registered, and a station-side terminal apparatus control unit configured to control correspondence between the subscriber-side terminal apparatus and the plurality of terminal devices, the path switching method comprising:
changing, by the station-side terminal apparatus control unit, a transmission destination of a unicast packet addressed to a switch-target subscriber-side terminal apparatus from a switching-source terminal device to a switching-destination terminal device;
transmitting, by a subscriber-side terminal apparatus sorting unit of a switching-destination terminal device, a unicast packet addressed to the subscriber-side terminal apparatus to a learned switch queue, when a switch-target subscriber-side terminal apparatus has been learned, with reference to a learning table;
transmitting, by the subscriber-side terminal apparatus sorting unit of the switching-destination terminal device, a unicast packet addressed to the subscriber-side terminal apparatus to an unused switch queue, and registering the switch queue in the learning table, when a switch-target subscriber-side terminal apparatus has not been learned;
transmitting, by a subscriber-side terminal apparatus sorting unit of each terminal devices, a packet addressed to a plurality of subscriber-side terminal apparatuses whose destinations include a subscriber-side terminal apparatus that has been learned to the broadcast queue and a learned switch queues, when a switch-target subscriber-side terminal apparatus has been learned, with reference to the learning table;
transmitting, by the subscriber-side terminal apparatus sorting unit of each terminal devices, a packet addressed to a plurality of subscriber-side terminal apparatuses whose destinations include a subscriber-side terminal apparatus that has not been learned to the broadcast queue and an unused switch queue, and registering the switch queue in the learning table, when a switch-target subscriber-side terminal apparatus has not been learned;

starting, by a switching-destination terminal device, transmission addressed to a switch-target subscriber-side terminal apparatus, and starting, by each terminal devices, transmission of a packet addressed to a plurality of subscriber-side terminal apparatuses whose destinations include a switch-target subscriber-side terminal apparatus, after an amount of packets addressed to the switch-target subscriber-side terminal apparatus accumulated in the switching-source terminal device becomes zero; and releasing a switch-target subscriber-side terminal apparatus from a learning table, and transmitting a unicast packet addressed to a switch-target subscriber-side terminal apparatus via the through queue, and transmitting a packet addressed to a plurality of subscriber-side terminal apparatuses whose destinations include a switch-target subscriber-side terminal apparatus via the broadcast queue, after an amount of unicast packets addressed to a switch-target subscriber-side terminal apparatus that accumulated in the switch queues and packets addressed to a plurality of subscriber-side terminal apparatuses whose destinations include a switch-target subscriber-side terminal apparatus becomes zero.

10. A station-side terminal apparatus comprising:

a plurality of terminal devices, each including a buffer unit including a through queue, and one or more switch queues, a subscriber-side terminal apparatus sorting unit configured to transmit a unicast packet addressed to a switch-target subscriber-side terminal apparatus and a packet addressed to a plurality of subscriber-side terminal apparatuses whose destinations include a switch-target subscriber-side terminal apparatus, to the switch queues, and transmit a unicast packet addressed to a non-switch-target subscriber-side terminal apparatus and a packet addressed to a plurality of subscriber-side terminal apparatuses whose destinations do not include a switch-target subscriber-side terminal apparatus, to the through queue, and a scheduler unit configured to read a packet from the switch queues and the through queue; and a terminal device sorting unit configured to transmit a received unicast packet to the terminal device in which a subscriber-side terminal apparatus of a destination of the unicast packet is registered, and transmit a received packet addressed to a plurality of subscriber-side terminal apparatuses, to each of the terminal devices in which a subscriber-side terminal apparatus of a destination of the packet is registered.

11. The station-side terminal apparatus according to claim 10, wherein the subscriber-side terminal apparatus sorting unit decides a queue of a transmission destination with reference to a learning table which associates the switch-target subscriber-side terminal apparatus with the switch queue, and when a subscriber-side terminal apparatus of a destination of a unicast packet is a non-switch-target subscriber-side terminal apparatus, transmits the packet to the through queue, and when the subscriber-side terminal apparatus of the destination of the unicast packet is a switch-target subscriber-side terminal apparatus, and the switch queues is registered in the learning table, transmits the packet to the registered switch queue, and when the subscriber-side terminal apparatus of the destination of the unicast packet is a switch-target subscriber-side terminal apparatus, and the switch queue is not registered in the learning table, transmits the packet to the unused switch queue, and registers the switch queue in the learning table, and when a packet is a packet addressed to a plurality of subscriber-side terminal apparatuses, and a destination of the packet does not include a switch-target subscriber-side terminal apparatus, transmits the packet to the through queue, and when a packet is a packet addressed to a plurality of subscriber-side terminal apparatuses, and a destination of the packet includes a switch-target subscriber-side terminal apparatus, and the switch queues for all switch-target subscriber-side terminal apparatuses included in a destination of the packet are registered in the learning table, transmits the packet to the through queue and all switch queues registered in the learning table, and when a packet is a packet addressed to a plurality of subscriber-side terminal apparatuses, and a destination of the packet includes a switch-target subscriber-side terminal apparatus, and a switch-target subscriber-side terminal apparatus included in a destination of the packet includes a subscriber-side terminal apparatus for which the switch queue is not registered in the learning table, transmits the packet to the through queue, all the switch queues registered in the learning table and the unused switch queue, and registers the unused switch queue in the learning table.

12. The station-side terminal apparatus according to claim 10, wherein a number of the switch queues is smaller than a number of subscriber-side terminal apparatuses that are registerable in the terminal device.

13. The station-side terminal apparatus according to claim 10, wherein a number of subscriber-side terminal apparatuses that simultaneously switch wavelengths is equal to or smaller than a number of the switch queues.

14. The station-side terminal apparatus according to claim 10, further comprising a station-side terminal apparatus control unit, wherein the terminal device sorting unit decides a terminal device of a transmission destination of a received unicast packet and a packet addressed to a plurality of subscriber-side terminal apparatuses, with reference to a table which associates a subscriber-side terminal apparatus with a terminal device in which the subscriber-side terminal apparatus is registered, and the station-side terminal apparatus control unit instructs each of the terminal devices a release from a switching-source terminal device and a registration to a switching-destination terminal device with respect to a switch-target subscriber-side terminal apparatus, and rewrites a LLID assigning table.

15. A path switching method of a station-side terminal apparatus connected to a subscriber-side terminal apparatus, that includes a plurality of terminal devices, each including, a buffer unit including a through queue, and one or more switch queues, a subscriber-side terminal apparatus sorting unit configured to transmit a unicast packet addressed to a switch-target subscriber-side terminal apparatus and a packet addressed to a plurality of subscriber-side terminal apparatuses whose destinations include a switch-target subscriber-side terminal apparatus, to the switch queues, and transmit a unicast packet addressed to a non-switch-target subscriber-side terminal apparatus and a packet addressed to a plurality of subscriber-side terminal apparatuses whose destinations do not include a switch-target subscriber-side terminal apparatus, to the through queue, a scheduler unit configured to read a packet from the switch queues and the through queue, and a learning table configured to associate the switch-target subscriber-side terminal apparatus with the switch queue; and a terminal device sorting unit configured to transmit a received unicast packet to the terminal device in which a subscriber-side terminal apparatus of a destination of the unicast packet is registered, and transmit a received packet addressed to a plurality of subscriber-side terminal apparatuses, to each of the terminal devices in which a subscriber-side terminal apparatus of a destination of the packet is registered, and a station-side terminal apparatus control unit configured to control correspondence between the subscriber-side terminal apparatus and the plurality of terminal devices, the path switching method comprising:
changing, by the station-side terminal apparatus control unit, a transmission destination of a unicast packet addressed to a switch-target subscriber-side terminal apparatus from a switching-source terminal device to a switching-destination terminal device;
transmitting, by a subscriber-side terminal apparatus sorting unit of a switching-destination terminal device, a unicast packet addressed to the subscriber-side terminal apparatus to a learned switch queue, when a switch-target subscriber-side terminal apparatus has been learned, with reference to a learning table;
transmitting, by the subscriber-side terminal apparatus sorting unit of the switching-destination terminal device, a unicast packet addressed to the subscriber-side terminal apparatus to an unused switch queue, and registering the switch queue in the learning table, when a switch-target subscriber-side terminal apparatus has not been learned;
transmitting, by the subscriber-side terminal apparatus sorting unit of each terminal device, a packet addressed to a plurality of subscriber-side terminal apparatuses whose destinations include the subscriber-side terminal apparatus to the through queue and to the learned switch queues, when a switch-target subscriber-side terminal apparatus has been learned, with reference to the learning table,
transmitting, by the subscriber-side terminal apparatus sorting unit of each terminal device, a packet addressed to a plurality of subscriber-side terminal apparatuses whose destinations include the subscriber-side terminal apparatus to the through queue and the unused switch queues, and registering the switch queues in the learning table, when a switch-target subscriber-side terminal apparatus has not been learned,
starting, by a switching-destination terminal device, transmission addressed to a switch-target subscriber-side terminal apparatus, and starting, by each terminal devices, transmission of a packet addressed to a plurality of subscriber-side terminal apparatuses whose destinations include a switch-target subscriber-side terminal apparatus, after an amount of packets addressed to the switch-target subscriber-side terminal apparatus accumulated in the switching-source terminal device becomes zero; and
releasing a switch-target subscriber-side terminal apparatus from the learning table, after an amount of unicast packets addressed to a switch-target subscriber-side terminal apparatus accumulated in the switch queue and packets addressed to a plurality of subscriber-side terminal apparatuses whose destinations include a switch-target subscriber-side terminal apparatus becomes zero, and transmitting a unicast packet addressed to a switch-target subscriber-side terminal apparatus and a packet addressed to a plurality of subscriber-side terminal apparatuses whose destinations include a switch-target subscriber-side terminal apparatus via the through queue.

16. The path switching method according to claim 15, wherein
when a transmission destination of a unicast packet addressed to the switch-target subscriber-side terminal apparatus is changed from a switching-source terminal device to a switching-destination terminal device,
a transmission destination of a packet addressed to a plurality of subscriber-side terminal apparatuses whose destinations include the switch-target subscriber-side terminal apparatus includes a switching-destination terminal device.

* * * * *